United States Patent [19]
Weisse

[11] Patent Number: 5,247,957
[45] Date of Patent: Sep. 28, 1993

[54] MODULAR LUBRICATION MULTIPLE CONCENTRATION CONTROL APPARATUS

[75] Inventor: Harley A. Weisse, Waukesha, Wis.

[73] Assignee: H. B. Fuller Company, Vadnais Heights, Minn.

[21] Appl. No.: 782,529

[22] Filed: Oct. 24, 1991

[51] Int. Cl.⁵ ................. F16N 7/30; G05D 11/13
[52] U.S. Cl. .................................... 137/3; 137/89; 137/101.21; 137/114; 137/597; 184/15.3
[58] Field of Search ............... 137/3, 89, 110, 101.19, 137/101.21, 114, 599.1, 607, 597; 184/15.2, 15.3

[56] References Cited

U.S. PATENT DOCUMENTS

| | | | |
|---|---|---|---|
| 2,600,877 | 6/1952 | Jeffree | 137/889 X |
| 3,565,112 | 2/1971 | Sides | 137/599.1 |
| 4,262,776 | 4/1981 | Wilson et al. | 137/93 X |
| 4,599,249 | 7/1986 | Bennett et al. | |
| 4,605,568 | 8/1986 | Kober | |
| 4,627,457 | 12/1986 | Bird et al. | 137/1 |

FOREIGN PATENT DOCUMENTS 2128944 4/1980 Fed. Rep. of Germany ........ 137/89

Primary Examiner—Stephen M. Hepperle
Attorney, Agent, or Firm—Vidas, Arrett & Steinkraus

[57] ABSTRACT

Method and apparatus for including within a carrier fluid to be utilized in different areas at least one additive in a constant predetermined concentration and at least one other additive in varying concentration depending on the particular area of use. For example, this invention allows various concentrations of one chemical such as a lubricant in a carrier liquid such as water to be delivered to selected different areas while maintaining a constant concentration of other chemicals such as chelates and the like in the carrier liquid. Thus, the invention lends itself to an apparatus and method of treating a plurality of zones of a processing line with a liquid, the liquid comprising a treatment liquid and a stock liquid in combination such as to maintain the concentration of one or more constituents constant while varying the concentration of one or more other constituents. The invention particularly concerns the lubricating of conveyors as in bottling lines and the like.

16 Claims, 3 Drawing Sheets

MODULAR LUBRICATION MULTIPLE CONCENTRATION CONTROL APPARATUS

BACKGROUND OF THE INVENTION

This invention relates in a preferred embodiment to a method and apparatus for treating a plurality of zones of a processing line with a carrier liquid, the liquid including a lubricant and additional ingredients. One particular application of the invention is in the distribution of a lubricant composition to surfaces which require lubrication and more particularly the distribution of lubricant composition to conveyors or tracks along which bottles or cans are conveyed.

In canning and bottling lines large numbers of cans or bottles are conventionally transported using variously designed conveyor systems. The cans or bottles slide along these conveyors and it is necessary to supply the conveyors with a lubricating material to reduce friction and to afford some cleaning action. Such materials are usually water soluble or water dispersible and may comprise active lubricating agents such as soap and optionally other components such as detergents, solvents and water softening and conditioning agents. Typically the carrier liquid is water which has been treated with chelates and bactericides. To be effective, such additives must be maintained at specific, minimal concentrations regardless of particular concentration being used for the lubricating additive.

Canning and bottling lines typically have many conveyor tracks in a conveyor system and the lubricant is diluted and applied to the various tracks in the system by spray, foam or drip application, the spray nozzles or other outlets being fed by a pipework system from a central point. At the central point, there is typically a dilution device which takes neat chemical product and dilutes it with the carrier liquid i.e., water in most cases. The resulting solution is pumped through the pipework system to the points of application. The thin watery lubricating composition is customarily pumped or sprayed onto the various conveyor tracks at a variety of selected locations.

The lubricating compositions previously used and most lubricating systems accomplish more than simply lubricating the conveyor. For example, in the beer brewing industry, the growth of bacteria on the conveyor is a problem. It has been customary in the past that the lubricating compositions sprayed onto the conveyor also include a bactericide for inhibiting bacteria growth. Similarly, the water supply in certain parts of the country has a relatively high mineral content. When such a water supply is used in the lubricating composition, it tends to rust or otherwise degrade the conveying apparatus. Thus, the lubricating composition also desirably contains a water conditioner and/or rust inhibitor. Other ingredients may also be included. Consequently, the lubricating composition which is conventionally sprayed onto the conveyors actually comprises a multiple-ingredient composition.

One prior art conveyor lubricating system is known as the Monarch Crown Lube System which is used by the Monarch Chemical Division of H. B. Fuller Company, the assignee of the present invention. In this system, a pump is provided for pumping a concentrate of the composition to the holding tank. This concentrate is then diluted with water to form the lubricating composition. The lubricating composition contained in the holding tank is then suitably applied to the conveyor. Operation of the pump for pumping the composition to the holding tank is controlled by a conductivity sensor in the holding tank.

Another system is disclosed in U.S. Pat. No. 4,262,776 to Wilson and Barrett. That patent is also assigned to H. B. Fuller Company, the assignee of the present invention. In this system, the ingredients which comprise the lubricating composition are supplied separately when formulating the composition by means of individual supply tanks in which a concentrate of each of the needed ingredients is held. Separate pumps are provided for separately conducting each of the ingredient concentrates to a holding tank. By varying pumping ratios the amount of any given ingredient in the final lubricating composition can be changed.

Another system has been disclosed in European Pat. Application No. 0079152 (Chemed Corporation). That application discloses an arrangememt in which the lubricant and water are piped separately to points along a conveyor. This system allows the lubricant to be individually metered at each point as the lubricant and water are not mixed in the pipework itself.

Another system is disclosed in U.S. Pat. No. 4,627,457 to Bird, Cross and Singh. That patent describes a method of treating a plurality of zones of a processing line with a liquid comprised of a treatment liquid and a carrier liquid wherein the treatment liquid is introduced into pipes conveying the carrier liquid to each zone as discrete slugs and wherein the volume of each slug is selectively variable or wherein each slug may be introduced into the pipes at a selectively variable frequency.

One of the earlier problems with prior art lubricating systems was that the lubricating composition concentrate contained predetermined ratios of the various ingredients therein. The problem was that a single formulation of the concentrate was seldom effective for all conveyor plant operations. For example, a particular conveying application might have a serious bacteria growth problem. This might require that the composition being used in that application contain a high level of bactericide. This adjustment might be made by increasing the amount of bactericide concentrate in the lubricating composition. However, because of the ratio of the bactericide in any given concentrate was always fixed relative to the levels of the lubricant or the water conditioner, increasing the amount of the bactericide and the composition also increased the amount of lubricant being used and also the amount of water conditioner used. Thus, the amount of lubricant when increased might be to a point of excess such that it was unnecessarily costly and wasteful.

As an example, certain parts of a canning or bottling track need more lubricating and cleaning than others. In particular, in a bottling line which uses bottles which have already been used and are returned dirty by the user, the bottles at the in-feed-end of the line have a large amount of soil on them which tends to be transferred to the track. Also, there is liable to be spillage of the product with which the bottles or cans are being filled at the filling station, and the spilled product ends up on the track. Accordingly, additional lubrication is desirable at the filling station and separately at the dirty bottle in-feed. Since the lubricant is typically a soap-like chemical, over lubrication leads to excessive foaming. Excess foam is detrimental, for example, because it can trigger off optical scanning instruments and if spilled on the floor can lead to a safety hazard. Further, over lubrication is expensive because lubricant is wasted. The main constituent of the track lubricant i.e., the soap or the like precipitates lime soaps in the presence of hard water i.e., when mixed with hard water in the diluting system. These precipitates block the spraying nozzles and are generally detrimental to the operation. To overcome this problem, it is known to add a sequestering agent to stop precipitation. However, this sequesterant is typically an expensive chemical.

Consequently, attempts have been made in the prior art as evident by the above referenced patents to allow individual control over the concentrations of the various ingredients in the carrier liquid for use at different points in a processing line. As can be seen from the above referenced patents, various approaches have been made to solve this problem primarily by supplying the various ingredients of the lubricating composition separately to the carrier liquid. However, none of the prior art solutions to the problem have been completely satisfactory in that they tended to be overly complicated. Thus, it is a primary objective of the present invention to provide a new and improved apparatus wherein water conditioning and sanitizing ingredients and any other ingredients may be maintained at proper concentrations while the lubricant or other ingredient concentration is varied as desired in a simple straight forward manner.

SUMMARY OF THE INVENTION

In its preferred embodiment, this invention provides a method and apparatus which allow the pretreatment of a water supply or other carrier fluid with chemicals to provide bactericide and water conditioners and/or other ingredients in a desired concentration. This pretreated water is then split into two branches of flow. One flow is treated with another chemical such as a lubricant to prepare a "stock" solution in which the lubricant or other chemicals can be varied in concentration by dilution, for example in the case of a lubricant from 1:1 to 1:100. The other flow is not treated further and is used as a diluent of the "stock" solution. It is sometimes referred to herein as the "treatment" solution. Further dilution of the "stock" solution is controlled by means of time controlled solenoids, pumps or the like (one for each zone in the processing line) which allow the blending of the first flow of treated water i.e., "stock" solution with the second flow i.e., the "treatment" solution. Any dilution can be obtained without varying the concentration of the bactericide or other water conditioning ingredients added before split of the flow since they are contained in both branches of flow.

In operation of the apparatus, the carrier liquid, such as water in a standard water supply line, flows into a control zone by means of line pressure or pump. The term "control zone" is meant to refer to the area in which ingredients are added to the water and solution blending takes place. Flow is measured with an electronic flow meter or a mechanical flow meter or the like. The flow meter provides a signal, electronic or mechanical, to a series of pumps. These pumps or feeding devices individually pump predetermined amounts of bactericides, lubricides, chelates and the like and other water conditioners into the carrier liquid water, which is then passed through a blending chamber or the like for mixing. The treated water flow is split with one portion, i.e., the "stock solution", being further treated with lubricants, detergents or other chemicals whose concentration will later be varied depending on the point of application. The other portion of the treated water stream i.e., the "treatment solution", is directed to a bank of control valves or metering devices (one for each zone of the processing line) where it is combined with the stock solution in various relative amounts to provide predetermined desired dilutions of the ingredients in the stock solution. Once the stock solution has been diluted, it passes into blending chambers to provide mixing of the two liquids for uniformity. The resultant solution is then transferred to the point of use in the zone for which it is intended.

The advantage of a system of this type is that it allows for certain chemical components to be maintained at an optimum concentration while allowing other components to be varied in concentration to maximize cost efficiencies.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

BRIEF DESCRIPTION OF THE DRAWINGS

The invention will be described in more detail hereinbelow when taken in conjunction with the following drawings in which like reference numerals refer to like elements throughout.

DESCRIPTION OF THE PREFERRED EMBODIMENTS

Figure 1:
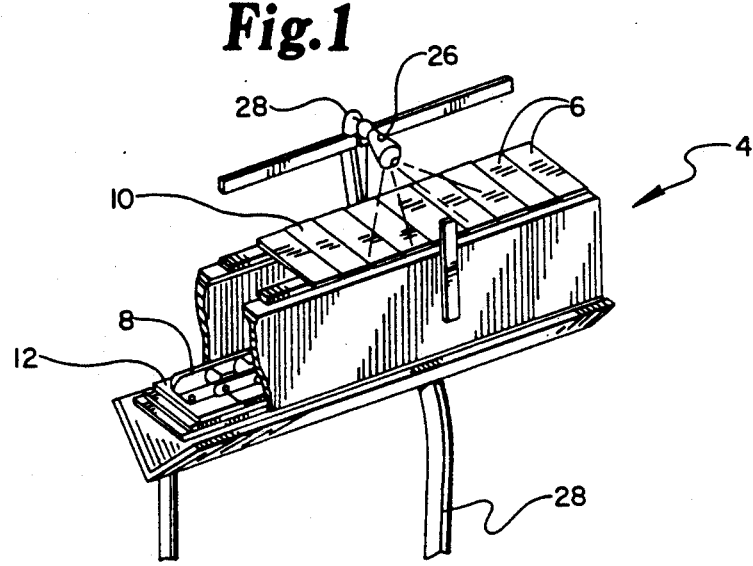
FIG. 1 is a schematic view of a conveyor lubricating system which may make use of the present invention.
Figure 2:
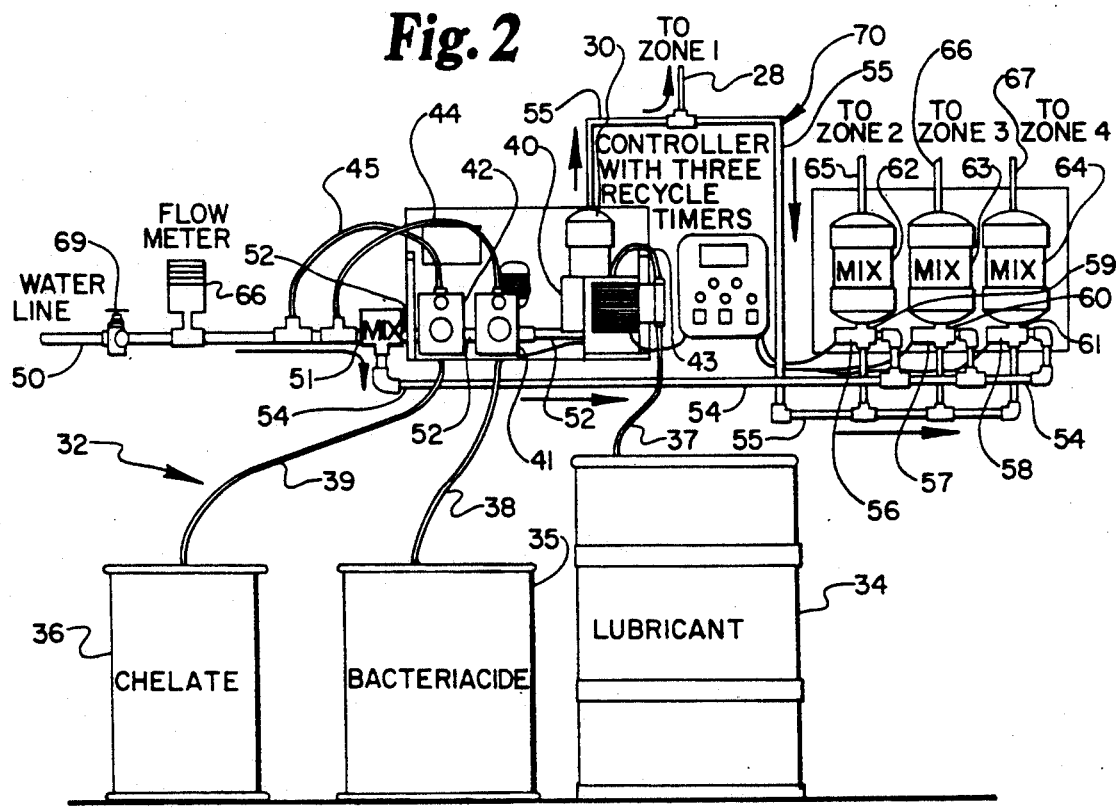
FIG. 2 is a is a schematic drawing of the apparatus of the present invention showing the preferred arrangement of a modular multiple zone lubrication apparatus or system which may be used with a conveyor system of the type shown in FIG. 1.

Referring first to FIGS. 1 and 2 together, an improved lubrication apparatus according to the present invention is generally illustrated in FIG. 2. The lubricating apparatus is particularly meant for use with a conveyor such as the arrangement shown generally at 4 in FIG. 1. Conveyor 4 may comprise any suitable conveyor which requires that a lubricating composition be applied thereto. As shown in FIG. 1, conveyor 4 may be a chain type conveyor which is suited for conveying bottles and or cans in the bottling industry. Conveyor 4 includes a plurality of article-carrying slot members 6 pivotally connected to a chain 8. Conveyor 4 has a top flight 10 and a bottom return flight 12 located underneath top flight 10.

Also, as shown in FIG. 1, a means for applying the lubricating composition to conveyor 4 will include any conventional spraying or other discharge means for simply conducting the lubricating composition onto top flight 10 of conveyor 4. A plurality of spray nozzles 26 (one of which is shown in FIG. 1) are one preferred means for applying the lubricating composition to top flight 10 of conveyor 4. Nozzles 26 are all connected by a supply conduit or pipe 28 to the discharge of mixing or blending chamber 30 (shown in FIG. 2).

What has been described thus far represents an arrangement for applying lubricating composition to one zone or area in the conveyor system in which the lubricant is present in the water carrier vehicle in a predetermined concentration, such as 50:1 and the additional ingredients, such as a chelate to bind heavy metals against precipitation such as nitrilotriacetic acid (NTA) or ethylenediaminetriacetic acid (EDTA) and a bactericide, are also present in a predetermined concentration or amount in the carrier vehicle water.

Also, as shown in FIG. 2, an apparatus of the invention includes means for supplying the various concentrates of the lubricant and additional ingredients to the carrier liquid as generally indicated at 32 in FIG. 2. Most lubricating compositions used in the bottling industry comprise a plurality of distinct components or ingredients in addition to a solvent or diluent. These ingredients generally include a suitable lubricant, a bactericide for inhibiting bacteria growth and a water conditioner or chelate for treating where necessary the mineral content of the water supply normally used to formulate the lubricating composition. The water conditioner in certain situations may also include a rust inhibitor. In any event, the lubricating composition which is formed in the water carrier usually includes one or more of the concentrates of these additional separate ingredients. In accordance with this invention and as shown in FIG. 2, a first supply tank or other container 34 is provided for holding a concentrate of a suitable lubricant or lubricating agent. A second supply tank or other container 35 is provided for holding a concentrate of a suitable bactericide and a third supply tank or other container 36 is provided for holding a supply of a suitable water conditioning agent or chelate which might also include a rust inhibitor. While the present invention is illustrated with regard to a system having three separate ingredients for forming the overall lubricating composition, any number of ingredients could be used wherein the overall lubricating composition serves additional functions. Likewise, any number of ingredients like the lubricant the concentration of which is to be varied by dilution, might be used and any number of additional ingredients like the chelate and bactericide, which are to be of fixed concentration, may be used as well. Each of the tanks 34–36 are respectively connected by fluid supply conduits or pipes 37–39. Each of the conduits 37–39 are respectively connected to suitable individual pumping means 40–42. High efficiency metering pumps such as the Series A37 and A77 for pumps 41 and 42, B72 or B73 for pump 40 or even D72 and D73 available from LMI, Liquid Metronics Incorporated, 18 Craig Road, Acton, Mass. 01720 are examples of preferred pumps. Pumps 40–42 are independently adjustable so that the amount of the concentrate being delivered by each pump to the carrier water via conduits 43–45 can be varied and precisely metered, typically determined by flow rate.

The apparatus, still referring to FIG. 2, also includes a water line supply conduit or pipe 50 which supplies the carrier liquid water to the apparatus. As can be seen in FIG. 2, the outputs of pumps 41 and 42 are connected by conduits 44 and 45 to water line 50 whereby a predetermined amount or concentration of bactericide 35 and chelate 36 are introduced into the carrier water.

After introduction of these concentrates, the water passes through a mixing chamber 51 and then the stream splits into two branches 52 and 54 to provide two streams A and B, respectively. Stream A passes through conduit 52 to pump 40; stream B passes through conduit 54. The output of pump 40 via conduit 43 is connected to branch pipe or conduit 52 so as to provide a supply of lubricant 34 to the water carrier flowing in branch 52 i.e., stream A. Branch 52 is connected to the inlet end of mixing or blending chamber 30 so as to introduce stream A into chamber 30 along with the added ingredients: lubricant 34, bactericide 35 and chelate 36. As can be seen in FIG. 2, the solution emanating from chamber 30 in conduit 55, in addition to being directed via conduit 28 to zone 1, is also directed via conduit 55 to the inlets of three solenoid valves 56–58 which serve to introduce fluid to a plurality of additional conveyor zones, such as zones 2–4, as indicated in FIG. 2. The solution, i.e., stream A, as it emanates from mixing chamber 30 (sometimes referred to as a "stock" solution herein), contains a predetermined concentration of lubricants such as 50:1 and a predetermined concentration of bactericide, such as 50–300 ppm and chelate, such as 1 ounce in 10 gallons to 1 ounce per gallon. Conduit or pipe 55 is suitably arranged to conduct the "stock" solution from the mixing chamber 51 to zone 1 and to the appropriate inlets of each of the three-way solenoid valves 56–58 as shown.

At the three way valves 56–58, the "stock" solution is diluted by the addition thereto of stream B water, sometimes referred to herein as "treatment solution", which is conducted to the second inlets of the valves 56–58 by means of conduit or pipe 54, as shown. The three way solenoid valves 56–58 may be of the preferred type provided by the Skinner Valve Division of Honeywell, Inc., 95 Edgewood Avenue, New Britain, Conn. 06051; Model 714N51B2A, three-way multipurpose valve. It can be seen that depending on the relative amounts of "stock solution" and "treatment solution" allowed to flow through each of the valves will, the dilution of the stock solution will vary only insofar as the lubricant 34 is concerned but not insofar as the bactericide 35 and chelate 36 is concerned since the latter two ingredients are contained in both solutions A and B whereas the lubricant is contained only in the "stock solution" A. Consequently, it is possible to obtain variations in the lubricant amount such as for example 100:1 in zone 2, 200:1 in zone 3, and 400:1 in zone 4 or any other relative amounts as desired without varying the chemical concentrations of the bactericide and chelate or other such additives.

Figure 3A:
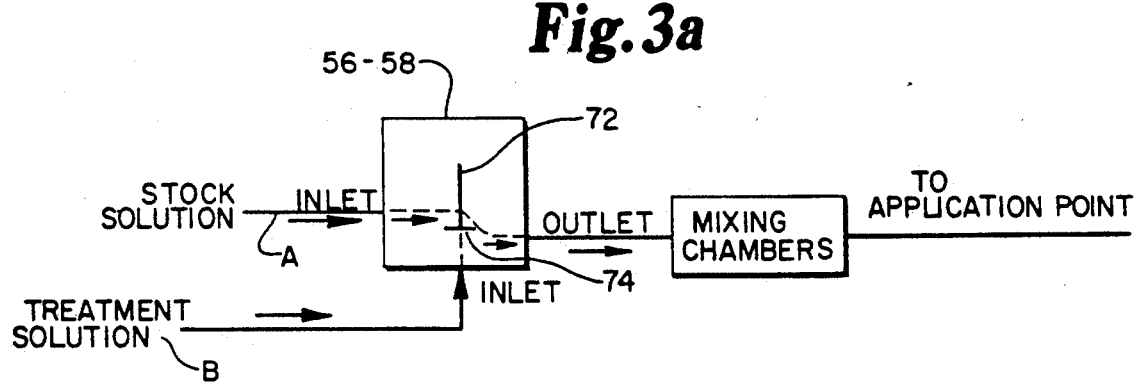
FIG. 3 (3a and 3b) are schematic showings of the operation of one type of preferred solenoid valve which may be used in a system according to this invention.
Figure 3B:
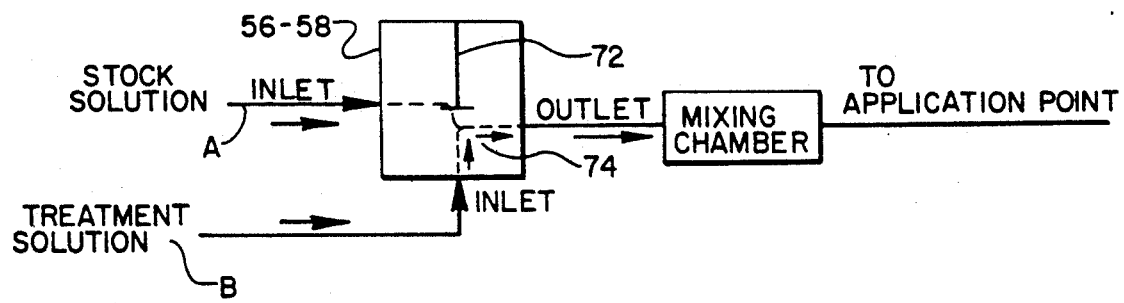

The primary purpose i.e., dilution in the operation of the system is achieved by pulsing the solenoid control valves 56, 57 and 58. This will be better understood by referring to FIG. 3A and 3B which schematically shows the pulsing operation of a solenoid controlled valve of the type preferred for use at 56–58. When no power is applied to the solenoid coil 72 (FIG. 3A), stock solution flows through the valve to the mixing chamber with the treatment solution port 74 blocked. Upon the application of power to the coil 72 (FIG. 3B), flow commences through the treatment solution port 74 to the mixing chamber with the stock solution port 76 being blocked. By varying the dwell time, ie., pulsing coil 72, an infinite variation of dilutions may be obtained. A small programmable controller may also be used for control of the dwell time using inputs to select the specific timer and output to pulse the solenoid valve. Other types of valves or the like may be used as well.

The outlets of valves 56-58 i.e., 59-61, (FIG. 2) conduct the various final mixtures of lubricating solution and so forth to corresponding mixing or blending chambers 62-64 which in turn after suitable mixing and blending of the final solutions, introduce them via conduits 65-67 to the various zones for which the solutions are ultimately intended for use in the conveyor system.

Figure 4:
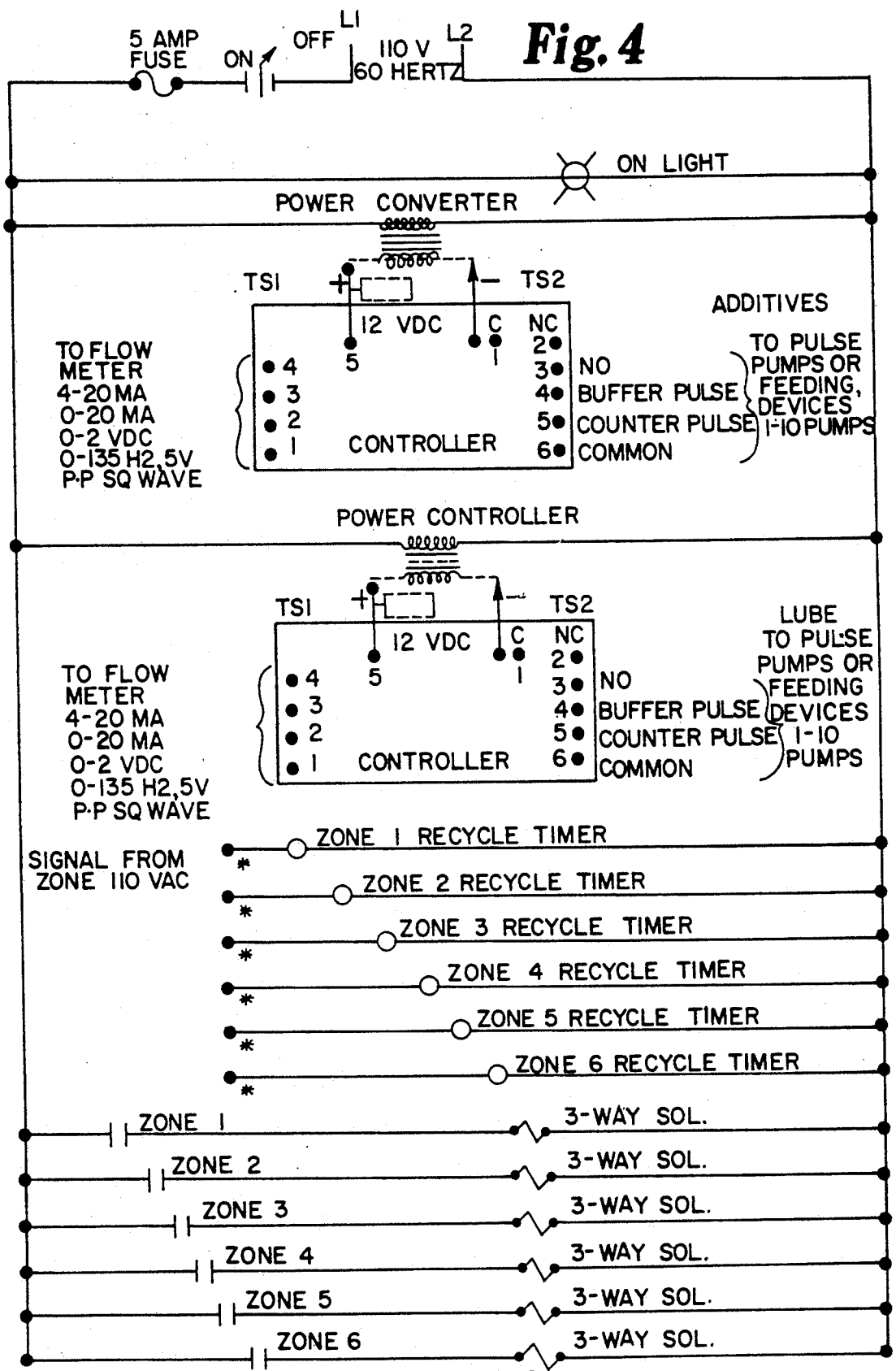
FIG. 4 is an electrical schematic view of one type of preferred control circuit which may be used with the apparatus shown in FIG. 2.

The operation of the apparatus shown in FIG. 2 is controlled by an electrical controller circuit means generally indicated at 70 with several recycle timers, (best understood with reference to FIG. 4) the number of recycle timers corresponding to the number of zones to be controlled and operated. The circuit schematic for a preferred controller 70 is shown in FIG. 4. In the apparatus of FIG. 2, the contoller would operate three recycle timers for controlling and operating zones 2-4. Zone 1 does not require one. Further understanding of controller 70 requires reference to FIG. 4 which shows an electrical circuit schematic for controller 70. Provision is made in the circuit for six zones to show for example that a wide variety of zones may be controlled and operated in accordance with the invention and that the invention is not limited to the zones shown in the embodiment of FIG. 2. The circuit shown is exemplary only and other circuit designs can be designed which would function in accordance with the broad teachings of this invention wherein dilution of a "stock" solution by a "treatment" solution may be accomplished to vary concentration of one or more ingredients in a "stock" solution by use of a "treatment" solution as a diluent. Also, the electrical recycle timers may be replaced with a programmable controller or the like. In the preferred embodiment shown, each recycle timer is of the known type which is a continuous electrical timer that recycles continuously to provide timed pulses to the solenoids valves when the timer is on, thereby pulsing the valves.

With respect now to the operation of the conveyor lubricating apparatus of the invention operation may for example commence when water flows through the system by opening a valve 69 (FIG. 2). This may be by manual or remote electrical or other means. For example, valve 69 may be an electrically operated valve which is opened when the conveyor line is started. The water passes through a flow meter 77 of the type described below, which generates an electrical signal. This analog signal which varies in intensity is transferred to controller 70 (electrical connection indicated in FIG. 4 but not in FIG. 2 for simplicity) where it is converted to digital electrical pulses. The controller pulses, which vary with the intensity of the signal from controller 70, drive the pretreatment pumps 40-42 (electrical connection indicated in FIG. 4 but not shown in FIG. 2 for simplicity). A satisfactory flowmeter is the low flow sensor Signet Model 2530, which may be obtained from Signet Scientific Co., 3401 Aero Jet Avenue, El Monte, CA 91731. As already noted, the number of pretreatment pumps may vary widely, for example from 1 to 10, depending on the type of treatment desired.

Once pretreatment is complete, the water flow is split into branch conduits 52 and 54 (FIG. 2) i.e., streams A and B, with part A going to a second treatment area where the primary dilution of lubricant is accomplished to provide the "stock" solution and part B going to the zoned solution solenoids as the "treatment" solution. The lubricating solution A is then directed to the zone control solenoids 56-58. Various concentrations of the final lubricating solution is obtained by pulsing the zone solenoids at different rates causing a dilution and blending of the lubricating solution A with pretreated water B and passing the mixture through the blending chambers to obtain uniform solutions.

More specifically, the apparatus of the invention is operated by demands from the zones. Therefore, the apparatus will be in an inactive state when all zones are inactive. When a zone becomes active, i.e., signals that it requires fluid treatment, a signal from the zone will activate the programmable controllers or the related recycle timers of controller 70. Simultaneously, appropriate pulse pumps are activated. Water flowing through the flow meter 77 will cause the additives pumps 41 and 42 to inject a precise amount of chelate, bactericide or any other desired additive regardless of flow rate. The flow meter provides an electrical signal to controller 70 which in turn provides a pulse signal to the pumps. The water and injected additives then pass to mixing chamber 51 in line 50-52 creating a homogeneous mixture of fluid. The mixture is then split into two streams A and B. Stream A passes via 52 through a second flow meter 79 of the type already described which provides an electrical signal to controller 70 which in turn provides a pulse signal to pump 40. Pulse pump 40 controls the amounts of those additives e.g., lubricant, which will be applied in varying concentration (due to subsequent dilution) at the different zones via conduit 55. After treatment, stream A passes through a mixing chamber 30 to provide a homogenous solution which is then supplied to the solenoid inlets via conduit 55, as shown in FIG. 2. Stream B is transferred directly to the appropriate inlets of the zone through solenoids via conduit 54, as shown. Controlled pulsing of the zone solenoids 56-58 by the related recycle timers allows controlled volumes of streams A and B to be passed through the valves and into mixing chambers. By varying the pulse rates of the solenoids 56-58, an infinite number of dilutions may be obtained from the A stream while maintaining constant concentration of the additives initially injected into the stream. As flows increase with the activation of additional zones, the pump pulses will increase to maintain the concentration in stock solutions A and B while the pulsing of the zone solenoids will determine the lube concentrations in a given zone by dilution of stream A with stream B. When a zone shuts down the zone solenoid stops pulsing and flow stops to that zone.

This completes the description of the preferred and alternate embodiments of the invention. Those skilled in the art may recognize other equivalents to the specific embodiment described herein which equivalents are intended to be encompassed by the claims attached hereto.

What is claimed is:

1. Apparatus for supplying carrier fluid containing a plurality of ingredients in fixed and varying amount therein to a plurality of zones in a processing line, the apparatus comprising in combination:

means for providing a supply of carrier fluid;

means for introducing a predetermined amount of at least one ingredient to the carrier fluid whereby a treated carrier fluid is provided;

means for dividing the treated carrier fluid into at least two portions;

means for introducing a predetermined amount of at least one other ingredient to one of the portions whereby a stock carrier fluid is provided;

means for combining predetermined relative amounts of treated carrier fluid and stock carrier fluid to provide at least one resultant fluid supply having a constant concentration of at least one first added ingredient and a lesser concentration of at least one second added ingredient.

2. The apparatus of claim 1 wherein the carrier fluid is a liquid.

3. The apparatus of claim 1 wherein the carrier fluid is water.

4. The apparatus of claim 3 wherein the second added ingredient comprises a lubricant.

5. Apparatus for treating a plurality of zones in a processing line with a liquid, the liquid comprising a homogeneous solution of a carrier liquid, and first and second types of ingredients, the first type being of fixed concentration in the carrier liquid, the second type being of varying concentration in the carrier liquid depending on the zone to which the liquid is to be applied at the processing line, the apparatus comprising:
a source of carrier liquid;
a pipe system conveying the carrier liquid to each zone, the system including branch pipes connecting the source of the carrier liquid to the concentrate source pipe, and individual zone pipes to each zone;
means individually connecting the outlet of the branch pipe and the outlet of the common source pipe, the inlet of each zone pipe, the means including means for combining various volumns of the outputs of the general branch pipe to provide different mixtures thereof at each zone, and
means for supplying the first type ingredients in predetermined amount to the general source pipe, and
means for supplying the second type ingredients in predetermined amount to the branch pipe.

6. The apparatus of claim 5 wherein the second type ingredients include a lubricant.

7. The apparatus of claim 6 wherein the carrier liquid is water.

8. The apparatus of claim 5 wherein the means connecting the branch pipe and source pipe to the zone pipes further includes electrical control circuit means for controlling the combining of the liquid for the source pipe and branch pipe into each zone pipe by controlling the dilution of the liquid in the branch pipe by the liquid in the general source pipe whereby any first ingredients in the carrier liquid are maintained in fixed concentration to all zones and the second ingredient in the carrier liquid may be varied in concentration to each zone in a predetermined manner.

9. The apparatus of claim 8 further including a three way electrically operated solenoid valve at the inlet end of each zone pipe, the source pipe and branch pipe being connected to individual inlets of the valve.

10. The apparatus of claim 9 further including a mixing chamber connected between each valve and zone pipe.

11. The apparatus of claim 5 including means for applying a portion of the fluid in the branch pipe with any ingredients is applied directly to one zone.

12. A method of treating a plurality of zones in a processing line with a carrier liquid, the liquid including a lubricant in variable concentration and at least one additional ingredient in fixed concentration, comprising the steps:
providing a flow of carrier liquid in a first pipe;
introducing a predetermined amount of ingredient to the flow of carrier liquid;
splitting a branch of flow of the ingredient bearing carrier liquid from the first pipe into the second pipe;
introducing a predetermined amount of lubricant to the flow of liquid in the second pipe and
recombining the flow from the first and second pipes in various relative amounts whereby the lubricant is diluted to various concentrations as desired for various zones while the concentration of the additional ingredient remains fixed.

13. The method of claim 12 wherein the line comprises a conveyor to be treated.

14. The method of claim 12 wherein the carrier liquid is water.

15. The method of claim 12 wherein multiple additional ingredients are included.

16. An apparatus for supplying carrier fluid containing a plurality of ingredients in fixed and varying amount therein to a plurality of zones in a processing line, the apparatus comprising in combination:
means for providing a supply of carrier fluid;
means for introducing a predetermined amount of at least one ingredient selected from the group of chelates, bactericides, water conditioners and rust inhibitors to the carrier fluid whereby a treated carrier fluid is provided;
means for dividing the treated carrier fluid into at least two portions;
means for introducing a predetermined amount of at least one other ingredient selected from the group of lubricants, lubricating agents, detergents, chelates, bactericides, water conditioners and rust inhibitors to one of the portions whereby a stock carrier fluid is provided;
means for combining predetermined relative amounts of treated carrier fluid and stock carrier fluid to provide at least one resultant fluid supply having a constant concentration of the first added ingredient and a lesser concentration of the second added ingredient;
whereby each zone of a processing line can be treated individually with a fluid containing differing concentrations of ingredients as required.

* * * * *